G. R. Peckham,
Cake Cutter,
N° 18,647.  Fig. 1.  Patented Nov. 17, 1857.
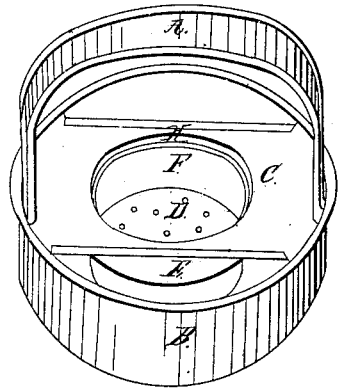
Fig. 2.
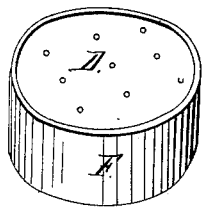
Fig. 3.
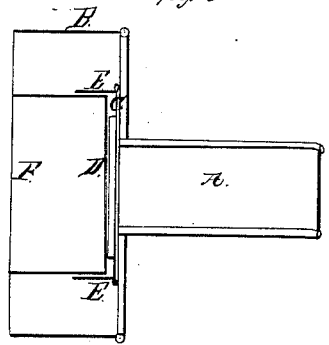
Inventor:
George R. Peckham

UNITED STATES PATENT OFFICE.

GEO. R. PECKHAM, OF WORCESTER, MASSACHUSETTS.

CAKE-CUTTER.

Specification of Letters Patent No. 18,647, dated November 17, 1857.

*To all whom it may concern:*

Be it known that I, GEORGE R. PECKHAM, of the city and county of Worcester and State of Massachusetts, have invented a new and useful Improvement in Cake-Cutters; and I do hereby declare the following is a full and exact description thereof, reference being had to the accompanying drawings and to the letters of reference marked thereon.

My invention, or improvement, consists in a cylindrical, square, or otherwise formed tube, with a head in one end, the whole being so constructed that it may be fastened at either end by entering a socket, or by means of a screw, pin, or other methods, to a cross piece, or head, secured to the upper rim of a common cake cutter, so that if the closed end of the tube be placed in the socket, or in any other manner fastened, as alluded to above, the open end being downward, it in conjunction with the outside cutter, constitutes a double cutter, both acting together cutting out a ring, or jumble, the name of the cake of this shape. By reversing the tube or cutter, in its position, as spoken of above, that is turning the cutter upward, with the closed end downward, the head on the end of the tube, becomes an instrument of depression, or impression, on the material encircled by the outer cutter, and in this manner, what are termed tarts are made, the head causing a depression in the dough, in which the jelly may be placed, the outside cutter cutting out the whole. Thus the whole is made in but two movable parts, which may be used each separately as cake cutters; by being put together one way, constitutes a double cutter, arranged the other way, is both a cutting and depressing instrument.

Giving an explanation of the accompanying drawings, Figure 1 represents a perspective view. A, the handle, affixed to the outside cutter B. C, the cross piece attached to the upper rim of the outside cutter. F the center or smaller cutter placed within the socket, E. D the head within or at the end of the cylinder F.

Fig. 2 represents the cutter F, with its head D, taken from its socket as shown in Fig. 1.

Fig. 3 is a transverse sectional view, with the cutter F, and head D, reversed in its position as shown in Fig. 1, the cutter being down and the head upward. H, is a rim turned in, on the cross piece C, for the purpose of keeping down the cutter F, level with the outside cutter B.

What I claim is—

The movable cutter F, with its head D, being placed in the socket E, as represented in Fig. 1, and its capability of being reversed in its position, as represented in Fig. 3, for the purposes and uses, as above specified.

GEORGE R. PECKHAM.

Witnesses:
   J. NELSON JACOBS,
   JAMES B. ROBBINS.